United States Patent [19]

Blutinger et al.

[11] Patent Number: 5,231,566

[45] Date of Patent: Jul. 27, 1993

[54] METHOD AND APPARATUS FOR PRODUCING A CATALOG

[75] Inventors: Elan Blutinger; Kara Kernan, both of Bethesda, Md.

[73] Assignee: Shoppers Express, Bethesda, Md.

[21] Appl. No.: 677,342

[22] Filed: Mar. 29, 1991

[51] Int. Cl.$^5$ .................. G06F 15/22; G06F 15/00; G06G 7/52

[52] U.S. Cl. .................. 364/401; 364/403

[58] Field of Search .................. 364/401, 403

[56] References Cited

U.S. PATENT DOCUMENTS

| | | | |
|---|---|---|---|
| 3,757,037 | 9/1973 | Bialek | 178/6.6 A |
| 3,796,487 | 3/1974 | Voorhees | 355/77 |
| 4,783,740 | 11/1988 | Ishizawa et al. | 364/403 |
| 4,797,818 | 1/1989 | Cotter | 364/401 |
| 4,984,155 | 1/1991 | Geier et al. | 364/401 |

OTHER PUBLICATIONS

U.S. Copyright Registration No. TX-329,734.
A copy of the two Information Disclosure Statements from co-pending U.S. Patent Application S.N. 07/578,626.

Primary Examiner—Roy N. Envall, Jr.
Assistant Examiner—Ari M. Bai
Attorney, Agent, or Firm—Sandler, Greenblum & Bernstein

[57] ABSTRACT

A method and apparatus are provided for producing a catalog of items that are to be offered for sale. A computer system is employed wherein a catalog item number is assigned to the items that are to be listed in the catalog. Each unique item contains a unique catalog item number. A cataloging software program that is executed by the computer determines whether an inputted item has previously been assigned a catalog item number by comparing the inputted item against a plurality of items in a master item list. If a catalog item number has not previously been assigned to the inputted item, a new catalog item number is generated and assigned to the inputted item. However, if the cataloging system determines that the inputted item already exists in the master item list, the catalog item number assigned to the item in the master list is also assigned to the inputted items. Accordingly, all like items have the same catalog item number, whereas different items have different catalog item numbers.

37 Claims, 13 Drawing Sheets

CATALOG CATEGORIES/CLASSIFICATIONS

FROZEN FOODS

FROZEN BREAKFAST/BREADS

FROZEN BAGELS
FROZEN BREAD
FROZEN BREAKFAST ITEMS

FROZEN DESSERTS/TOPPINGS

FROZEN DESSERTS
FROZEN PASTRIES
FROZEN PIES
FROZEN SNACKS
FROZEN TOPPINGS

FROZEN ENTREES/DINNERS

FROZEN CHICKEN
FROZEN DIET ENTREES
FROZEN DINNERS
FROZEN ENTREES
FROZEN MEXICAN FOODS
FROZEN SANDWICHES
FROZEN SEAFOOD
FROZEN STEAKS
FROZEN TURKEY

FROZEN FRUITS/VEGETABLES

FROZEN FRUIT-PACKAGE
FROZEN POTATOES
FROZEN VEGETABLES

FROZEN JUICE

FROZEN JUICE

FROZEN PIZZA/PASTA

FROZEN PASTA
FROZEN PIZZA

ICE CREAMS/SHERBET

FROZEN COFFEE CREAMS
FROZEN YOGURT
FRUIT BARS
ICE CREAM
ICE CREAM BARS
ICE CREAM NOVELTIES
ICE CUBES
ICE MILK
SHERBET

GROCERY

BABY NEEDS

BABY CEREAL
BABY FOOD
BABY FORMULAS
BABY JUICES
BABY PRODUCTS, MISCELLANEOUS
DIAPERS

Fig- 2A

BAKERY- FRESH - IN STORE

FRESH BAKED GOODS
FRESH BAKED BREAD
FRESH PASTRY ITEMS

BAKERY PRE-PACKAGED

BAGELS
BAKERY SNACKS
BUNS
ENGLISH MUFFINS
FRENCH BREAD
ROLLS
WHEAT BREAD
WHITE BREAD
VARIETY BREADS

BAKING NEEDS

ARTIFICIAL SWEETENERS
BAKING CHOCOLATE & BITS
BAKING SODA
BISCUIT, MUFFIN & ROLL MIXES
BROWN SUGAR
CAKE & BROWNIE MIX
COCONUT
COOKIE MIXES
COOKING WINE
CORN MEAL
DESSERT MIXES
FLOUR
FROSTING
GRANULATED SUGAR
MARSHMALLOW CREAM
PIE CRUST
PIE CRUST MIXES
PIE FILLING, CANNED
POWDERED SUGAR
YEAST

BEVERAGES

BOTTLED WATER
DRINK MIXERS
DRINK MIXES
NON-ALCOHOLIC BEER & WINE
SODA-COLA
SODA-DIET
SODA-FLAVORS
OTHER SOFT DRINKS

CANDY & GUM

CANDY BARS
CANDY, MISC
CHOCOLATE, PACKAGED
COUGH DROPS
GUM, PACKAGED
LICORICE
MARSHMALLOWS

CANNED/GLASS FRUIT

APPLES
APPLESAUCE
APRICOTS
CHERRIES
CRANBERRIES
FRUIT COCKTAIL
GRAPEFRUIT
MANDARIN ORANGES
PEACHES
PEARS
PINEAPPLE
PRUNES
OTHER CANNED/GLASS FRUIT

CANNED MEAT & FISH

ANCHOVIES
BEEF & PORK
CAVIAR
CHICKEN

FIG- 2B

CRAB, CLAMS, OYSTERS
HERRING
JARRED SEAFOOD
LUNCH MEAT
SALMON
SARDINES
SHRIMP
TUNA
OTHER CANNED MEAT & FISH

CANNED/GLASS VEGETABLES

ARTICHOKE
ASPARAGUS
BEANS
BEETS
CARROTS
CORN
MUSHROOMS
ONIONS
PEAS
PORK N BEANS
POTATOES
SAUERKRAUT
SPINACH
TOMATOES
YAMS
OTHER CANNED/GLASS
  VEGETABLES

CEREAL & BREAKFAST FOODS

BLENDED & MAPLE SYRUP
BREAKFAST BARS
CEREALS, MISC
COLD CEREAL
CORN SYRUP
FRUIT SYRUP
HOT CEREAL
INSTANT BREAKFAST
PANCAKE MIX
TOASTER PASTRIES

COFFEE

COFFEE, BAG
COFFEE, CAN
DECAFFEINATED COFFEE
DECAFFEINATED INSTANT COFFEE
FLAVORED COFFEE
INSTANT COFFEE

CONDIMENTS & POURABLE SAUCES

BARBECUE SAUCE
COCKTAIL SAUCE
HOT SAUCE
ICE CREAM SAUCES
KETCHUP
MUSTARD
STEAK SAUCE
TARTAR SAUCE
WORCESTERSHIRE SAUCE
MISCELLANEOUS CONDIMENTS

COOKIES

COOKIES, BAG
COOKIES, BOXED
COOKIES, IMPORTED
RICE/POPCORN CAKES

COOKING OILS/SHORTENING

CORN OIL
OLIVE OIL
MISCELLANEOUS OIL
NON-STICK SPRAY COATING
SHORTENING
VEGETABLE OIL

Fig- 2C

CRACKERS

BREADING MIX
CROUTONS
GOURMET CRACKERS
PLAIN CRACKERS
SALTINE CRACKERS
SNACK CRACKERS
STUFFING, BREAD CRUMBS

DAIRY

BOLOGNA
BUTTER
CHEESE, BULK
CHEESE, MISCELLANEOUS
CHEESE SPREADS
CHEESES, NATURAL
CHEESES, PROCESSED
CHEESES, SLICED
COTTAGE CHEESE
CREAM
CREAM CHEESE
EGGS
GRATED/SHREDDED CHEESE
LUNCHEON MEATS
MARGARINE
MILK
RICOTTA CHEESE
SOUR CREAM
REFRIGERATED BISCUITS
REFRIGERATED DRINKS
REFRIGERATED DIPS
REFRIGERATED JUICES
REFRIGERATED MEXICAN
REFRIGERATED NON-DAIRY
  CREAMERS
REFRIGERATED PASTA & SAUCES
REFRIGERATED PIE CRUST
REFRIGERATED PUDDINGS
REFRIGERATED SEAFOOD
REFRIGERATED SNACKS
REFRIGERATED TOPPINGS
REFRIGERATED YEAST
YOGURT

DRY PASTA PRODUCTS

MACARONI-DRY
NOODLES-DRY
PASTA, MISCELLANEOUS
SPAGHETTI

ETHNIC FOODS

CHINESE FOODS
KOSHER FOODS
MEXICAN FOODS

JUICES

BOTTLED JUICES
BOXED JUICES
CANNED JUICES

MILK, DRY MILK

CHOCOLATE SYRUP
COFFEE CREAMERS
CONDENSED & SKIM MILK
EVAPORATED MILK
HOT COCOA MIX
INSTANT DRY MILK
INSTANT FLAVORED POWDER
MILK BOXED

NUTS

BAKING NUTS
SNACK NUTS

PEANUT BUTTER, JELLY, PRESERVES

DIET PRESERVES
HONEY
JAMS

Fig-2D

JELLIES
PEANUT BUTTER
PRESERVES
SPREADS

PET CARE

BIRD SEED
CAT FOOD, CANNED
CAT FOOD, DRY
CAT LITTER
DOG FOOD, CANNED
DOG FOOD, DRY
PET TREATS

PICKLES, OLIVES, RELISHES,
    PICKLED PEPPERS, VINEGAR

OLIVES
PICKLED PEPPERS
PICKLES
RELISHES
VINEGAR

PREPARED FOODS

CANNED PASTA
DRIED PACKAGE DINNERS & SIDE
  DISHES
GELATIN DESSERT
GRAVY MIX-LIQUID
GRAVY & SAUCE MIX
MICROWAVEABLE FOODS
PREPARED PUDDING & SNACKS
SEASONING MIXES
SPAGHETTI SAUCE
TOMATO PASTE
TOMATO SAUCE

RICE/BEANS

DRY BEANS
INSTANT RICE

REGULAR RICE
RICE MIXES

SALAD DRESSING & MAYONNAISE

DRY DRESSING MIXES
MAYONNAISE/SALAD DRESSING
SALAD DRESSING-LO-CAL/POUR
SALAD DRESSING-POURABLE/REG

SEASONINGS

BACON BITS
EXTRACTS
ITALIAN SEASONINGS
MARINADES
MEAT TENDERIZERS
SALT & PEPPER
SALT SUBSTITUTE
SEAFOOD SEASONINGS
SPICES

SNACKS

CHEESE SNACKS
CORN CHIPS
DIET SNACKS
NACHO CHIPS
OTHER SNACKS
POPCORN, BAG
POPCORN, MICROWAVEABLE
POTATO CHIPS
PRETZELS
SNACK TOPPINGS

SOUP

BOUILLON
CANNED SOUP-CONDENSED
SOUP, MIXES
SOUP, READY TO SERVE
SOUP, INSTANT/DRY

FIG-2E

TEA

ICED TEA MIX
INSTANT TEA
TEA BAGS

HEALTH & BEAUTY

DENTAL NEEDS

DENTAL FLOSS
DENTURE ADHESIVES
DENTURE CLEANERS
MOUTHWASH
TOOTH BRUSHES
TOOTH PASTE

HAIR NEEDS

CONDITIONERS
HAIR ACCESSORIES
HAIR COLORING & RINSES
HAIR SPRAY
SHAMPOO
STYLING MOUSSE/GEL

HAND SOAP

BAR SOAP
LIQUID SOAP

HEALTH AIDS

ADHESIVE BANDAGES
ALLERGY REMEDIES
ANALGESICS
ANTACID
COLD REMEDIES
EYE CARE
FIRST AID CREAM
INCONTINENTS
LAXATIVES

OINTMENTS
PAIN RELIEVERS
PROPHYLACTIC
SLEEPING AIDS/STIMULANTS
VITAMINS

SUNDRIES

AFTER SHAVE
BATH ADDITIVES
DEODORANTS
FEMININE HYGIENE
FEMININE NAPKINS
MOISTURIZERS
PANTY HOSE
POWDER
RAZORS
SHAVING CREAMS
SHOE POLISH
SKIN CARE AIDS
TAMPONS

HOUSEHOLD PRODUCTS

DISHWASHING SUPPLIES

LIQUID DISH DETERGENT
AUTO DISH DETERGENT

GENERAL MERCHANDISE

AUTOMOTIVE
BATTERIES
BLANK AUDIO AND VIDEO TAPES
CANDLES
CHARCOAL & MATCHES
FILM
FLASHLIGHTS
LIGHT BULBS
LIGHTERS
SCHOOL & OFFICE SUPPLIES

Fig-2F

HOUSEHOLD SUPPLIES

AIR FRESHENERS
BOWL CLEANERS
BROOMS/MOPS/BRUSHES
CLEANERS ALL-PURPOSE
DISINFECTANTS
DEODORIZERS
DRAIN CLEANERS
FLOOR WAXES
FLOOR WAX REMOVERS
FURNITURE POLISH
GLASS CLEANER
INSECT SPRAY
OVEN CLEANERS
RUG CLEANERS - VACUUM BAGS
SCOURING PADS & STEEL WOOL
SPONGES & TOWELS
TILE CLEANERS

LAUNDRY SUPPLIES

BLEACH/NON CHLORINE BLEACH
DRY LAUNDRY DETERGENT
DRYER SHEETS
FABRIC SOFTENERS
LAUNDRY STARCH
LAUNDRY SUPPLIES
MISCELLANEOUS
LIQUID LAUNDRY DETERGENT

MAGAZINES/PERIODICALS

MAGAZINES
PERIODICALS

MISCELLANEOUS PAPER PRODUCTS

ALUMINUM WRAP
BATH TISSUE
COFFEE FILTERS
CUPS: PAPER, PLASTIC & STYRO
FACIAL TISSUE

NAPKINS
PAPER BAGS
PAPER & PLASTIC PLATES
PAPER TOWELS
PLASTIC CUTLERY
PLASTIC WRAPS
WAXED PAPER

PLASTIC BAGS

FREEZER BAGS
SANDWICH BAGS
STORAGE BAGS
TRASH/LAWN BAGS

MEAT DEPT.

DELI ITEMS - IN STORE

BOLOGNA
CHEESE MISCELLANEOUS
CHICKEN MEATS
COOKED BEEF ITEMS
DELI BREADS
DELI DESSERTS
DELI SNACKS
DELI MISCELLANEOUS
DELI PIZZA
DOMESTIC CHEESE
IMPORTED ENGLISH CHEESE
IMPORTED FRENCH CHEESE
IMPORTED GERMAN CHEESE
IMPORTED GREEK CHEESE
IMPORTED ITALIAN CHEESE
IMPORTED SWISS CHEESE
HAM ITEMS
LOAF ITEMS
LOW FAT, LOW SALT CHEESE
PARTY PLATTERS
REFRIGERATED DELI PASTA
SALAMI
SALADS & ENTREES
SANDWICHES TO GO
TURKEY ITEMS

Fig-2G

MEAT

BACON
BEEF SAUSAGE
CANNED HAM
CHIP BEEF
COOKED PORK
FRANKFURTERS
FRESH SAUSAGE
GROUND MEATS
JERKY
LAMB FRESH
LAMB
LIGHT CUTS
LIVER
PORK SAUSAGE
PORK
POULTRY
ROAST BEEF "BONE IN"
ROASTS BEEF BONELESS
SALAMI
SAUSAGE, ITALIAN
SMOKED MEATS
SMOKED CHICKEN SAUSAGE
SMOKED HAM
SMOKED SAUSAGE
SPECIALTY CUTS
STEAKS BEEF, "BONE IN"
STEAKS BEEF BONELESS
TURKEY PARTS FRESH
VEAL

SEAFOOD

FRESH FISH
SHELLFISH
SHRIMP

PRODUCE DEPT.

PRODUCE

APPLES
BANANAS
BERRIES
CITRUS
DRIED FRUIT
FRESH VEGETABLES
GRAPES
GREENS
HERBS
MELONS
MISCELLANEOUS PRODUCE
MUSHROOMS
NECTARINES
ONIONS
PEACHES
PEARS
PEPPERS
PINEAPPLE
PLUMS
POTATOES
SALAD VEGETABLES
TOMATOES
TROPICAL FRUIT

FLORAL

ASSORTED ARRANGEMENTS
PLANTS

FIG- 2H

| CATALOG NO. | DESCRIPTION | SIZE |
|---|---|---|

CEREAL & BREAKFAST FOODS

28D

30

COLD CEREAL

28C

30

| | | |
|---|---|---|
| 01929 | KELLOGG'S CORN FLAKES | 12 OZ. |
| 01930 | KELLOGG'S RICE KRISPIES | 10 OZ. |
| 01931 | KELLOGG'S RAISIN BRAN | 15 OZ. |
| 01932 | KELLOGG'S BRAN FLAKES | 16 OZ. |

28B

| CATALOG NO. | DESCRIPTION | SIZE |
|---|---|---|
| 08039 | KELLOGG'S CORN POPS | 15 OZ. |
| 01946 | KELLOGG'S COCOA KRISPIES | 15 OZ. |
| 08040 | KELLOGG'S HONEY SMACKS | 17.6 OZ. |
| 01933 | KELLOGG'S FROSTED FLAKES | 15 OZ. |
| 08043 | KELLOGG'S SPECIAL K | 12 OZ. |
| 08041 | KELLOGG'S FRUIT LOOPS | 15 OZ. |
| 01935 | KELLOGG'S PRODUCT 19 | 12 OZ. |
| 10022 | FAMILIA REGULAR MUESLIX CEREAL | 12 OZ. |
| 10023 | FAMILIA NO SUGAR MUESLIX CEREAL | 12 OZ. |
| 10024 | WEETABIX CEREAL | 7 OZ. |
| 04931 | QUAKER CAP'N CRUNCH CEREAL | 16 OZ. |
| 04932 | QUAKER CRUNCHBERRIES CEREAL | 15 OZ. |
| 10987 | PEANUT BUTTER CAP'N CRUNCH | 15 OZ. |
| 04926 | QUAKER LIFE CEREAL | 20 OZ. |
| 04930 | QUAKER OAT SQUARES CEREAL | 16 OZ. |
| 04929 | QUAKER OAT BRAN CEREAL | 15 OZ. |
| 10028 | POST GRAPE NUTS | 24 OZ. |
| 08054 | POST RAISIN BRAN | 20 OZ. |
| 10029 | POST ALPHA BITS | 15 OZ. |
| 10030 | POST MARSHMALLOW ALPHA BITS | 14 OZ. |
| 10031 | POST SUPER GOLDEN CRISP | 18 OZ. |
| 10032 | GENERAL MILLS APPLE CINN. CHEERIOS | 20 OZ. |
| 04940 | GENERAL MILLS CLUSTERS | 15.5 OZ. |
| 01963 | GENERAL MILLS FIBER ONE | 13.5 OZ. |

HOT CEREAL

30

28C

| | | |
|---|---|---|
| 12054 | CREAM OF WHEAT QUICK | 28 OZ. |
| 12057 | NABISCO MIX & EAT APPLE | 12.5 OZ. |
| 12058 | NABISCO MIX & EAT STRAWBERRY | 12.5 OZ. |
| 12059 | NABISCO MIX & EAT MAP. BR. SUGAR | 12.5 OZ. |
| 12070 | QUAKER INSTANT OATS AP. & CINN. | 16 OZ. |
| 12071 | QUAKER INSTANT OATS CINN. & SPICE | 16 OZ. |
| 12073 | QUAKER OATS QUICK | 18 OZ. |

PAGE 00

Fig - 3

Catalog Participation Worksheet /—32

| For Supermarket Use Only | MERCHANDISER: _____ |
|---|---|
| PHONE: _____ | DATE REC: _____ |

BROKER: _____  ADDRESS: _____
VENDOR: _____
PHONE: _____  FAX: _____

Please List One Category and One Classification Per Page

REQUESTED CATEGORY: _____

REQUESTED CLASSIFICATION: _____

DID YOU PURCHASE RIGHTS FOR FIRST PLACEMENT FOR THIS CLASSIFICATION?  YES ____  NO ____

PRODUCT INFORMATION MUST BE TYPED

| UPC CODE (11 Digits) | PRODUCT DESCRIPTION & SIZE (Up to 50 characters) |
|---|---|
| 02351790876 | BUMBLE BEE WHITE TUNA IN WATER 6.5 OZ. |

Explanations of Contract / Package Breakdown

STEP 1. FILL IN ALL REQUIRED VENDOR-MERCHANDISER INFORMATION. NAME, DATE, PHONE #...

STEP 2. UNDERSTANDING THE PACKAGES

PACKAGE A. (LINE ENTRIES)
  $ PER LINE-PRICE CHARGED PER PRODUCT ENTRY.
THIS PACKAGE ENTITLES THE VENDOR TO LIST A PRODUCT IN THE CATALOG. REMEMBER EACH LINE REPRESENTS A PRODUCT ON YOUR STORE'S SHELF.

PACKAGE B. (RIGHT FOR FIRST PLACEMENT)
  $ PER CLASSIFICATION-PRICE CHARGED PER RIGHT FOR FIRST PLACEMENT
THIS PACKAGE ENTITLES THE VENDOR TO FIRST PLACEMENT OF PRODUCT LINES IN A PARTICULAR CLASSIFICATION. EACH LINE MUST BE PURCHASED SEPARATELY. PRODUCT LINES WILL APPEAR IN RED BOLD TYPE.

PACKAGE C. (1/10 PAGE CLASSIFICATION AD)
  $ PER CLASSIFICATION-PRICE CHARGED PER CLASSIFICATION AD.
THIS PACKAGE CONTAINS ILLUSTRATIONS LOCATED DIRECTLY BELOW A CLASSIFICATION HEADING. THE CUSTOMERS ATTENTION WILL BE IMMEDIATELY DRAWN TO THE PRODUCTS LISTED. THE AD SLICK CAN REFLECT UP THREE PRODUCTS WHICH APPEAR IN A GIVEN CLASSIFICATION. PLEASE INCLUDE ALL APPROPRIATE ART WITH EACH PARTICIPATION CONTRACT.

PACKAGE D. (1/5 PAGE CATEGORY AD)
  $ PER 1/5 PAGE CATEGORY AD-PRICE CHARGED PER AD COVERING 1/5 OF A CATALOG PAGE.
A 1/5 PAGE AD MERCHANDISES PRODUCTS MUCH LIKE AN END AISLE DISPLAY. UP TO FIVE PRODUCTS MAY BE ADVERTIZED IN THIS SPACE. PLEASE INCLUDE ALL APPROPRIATE ARTWORK WITH EACH PARTICIPATION CONTRACT.

PACKAGE E. (INSIDE FRONT/INSIDE BACK/BACK COVER)
  $ PER INSIDE COVER

PACKAGE F. (FULL PAGE/FULL COLOR AD)
  $ PER FULL PAGE AD

Fig- 4

METHOD AND APPARATUS FOR PRODUCING A CATALOG

BACKGROUND OF THE INVENTION

1. Field of the Invention

The present invention is directed to a method and apparatus for automating the production of sales catalogs, e.g., grocery sales catalogs; and in particular, to the assigning of unique catalog numbers for particular items that are to be included in the sales catalogs.

2. Discussion of Background and Other Information

Traditionally, it has been customary for individuals to visit a store to purchase items, such as groceries. In particular, it is customary for an individual to personally visit the local supermarket or butcher to purchase all the household food supplies and consumables that are needed. However, over time, a significant proportion of households have become two-income families, in which both spouses work. This has resulted in the need to perform essential household chores, such as grocery shopping, during one's non-working (or, "free") time. However, many individuals do not want to go grocery shopping after spending a day at the office, and are relegated to shopping on the weekends. Accordingly, a need has developed to reduce the drudgery of shopping for home items.

Another situation exists with respect to the aged and infirm. Modern medicine has enabled people to live longer lives. However, while people are living longer, they are not necessarily able to perform the same tasks that they could do when they were younger. For instance, an elderly individual may not be able to lift several bags of groceries. Alternatively, a person may be restricted to using a wheelchair or walker, thus preventing that person from carrying several bags of groceries. Accordingly, a need has arisen to develop a system that allows them to go about purchasing a plurality of goods without physically having to purchase such items.

In an attempt to help the above individuals, the assignee of the present invention previously established procedures whereby individuals can call a central order taking facility. The order is then forwarded to a store in the geographic location that serves the customer (and, which typically is part of a chain, such as, for example, Safeway in the Washington, D.C. area), the order items are selected by a store employee and packed so that the items can be either picked up or delivered to the individual's home.

To assist the customer in placing an order, a catalog of items is produced for each served geographic location and/or each chain participating in the system. To produce an accurate catalog, each store has been required to generate an inventory list of every item that is carried by the store. Thereafter, the items must be classified (e.g., meat or diary product) and listed in an easy to refer to catalog. In addition, it has been necessary to assign an item number to each product to facilitate the order process.

However, as the ordering system developed and was expanded to include additional geographic locations and retail outlets/chains, it became more difficult to produce catalogs for each geographic region while ensuring that every different product is assigned only one unique item number. For instance, different stores in different geographic regions may sell many similar type products. For example, grocery stores in New York and Washington, D.C. may sell the same brands of a product, such as cream cheese manufactured by Temp Tee, Breakstone, etc. However, a store in another geographic region, such as, for example, Chicago, may not sell Temp Tee or Breakstone cream cheese, but instead sell other products that are unique to that area, such as, for example, Lady Lee cream cheese. Thus, it is important to assign each different product, e.g., each different size and/or manufacturer, a different product code number.

Another problem that arose is that each manufacturer normally packages its products in many different sizes, such as, 2 ounces, 4 ounces, 8 ounces, etc. However, many stores do not carry each product in every manufactured product size. For instance, a store in New York may offer Temp Tee cream cheese in the 4 ounce and 16 ounce sizes, while a store in the Washington, D.C. area may offer the same product in only the 4 ounce and 8 ounce sizes; and each such sized-product requires a different catalog number.

Accordingly, the assignees of the present invention attempted to device a system for assigning catalog numbers to each product listed in a catalog for a particular region by using the Universal Product Council numbers (UPC numbers) that are assigned to each product. In fact, various features of such a system are fully disclosed in commonly assigned, copending U.S. patent application Ser. No. 07/578,626 filed on Sep. 7, 1990 and entitled "Centralized Order Taking System", the entire disclosure of which is expressly incorporated by reference herein. However, it was quickly discovered that the UPC numbers were not consistent for a given product, varying from region to region. Accordingly, the assignee of the present invention attempted to match descriptions between a new catalog and a master catalog in order to determine whether a product had been previously coded, and thereby minimize the number of new product numbers being assigned. This approach resulted in inaccuracies and a large number of repetitive entries because of the different manner in which many products would be listed. For example, in certain instances the brand name of the product would not be listed first. In other cases, the brand name of the product would not be listed at all, because the product is self defining, such as, for example, Cheerios for cereal. Other inaccuracies would result from the rounding of sizes, such as, for example, stating that 8.5 ounces is equivalent to 9 ounces. Accordingly, a new system for easily and accurately cataloging a large number of products, and assigning a unique catalog number to each unique product, was required.

Another major problem which arose, however, related to the capacity of the catalog-generating system, which was only capable of generating and assigning 99,999 product numbers. Unfortunately, because of the noted differences in e.g., product descriptions and UPC numbers, several catalog product numbers were often assigned to the same product, thereby unnecessarily utilizing catalog numbers and severely reducing the capacity of the system. Accordingly, it was necessary to develop a catalog-producing system and apparatus which would maximize the chance of a product-to-catalog number "match", and minimize the number of catalog numbers used. In this way, the system would be capable of accommodating many more products for a given system capacity, and closely approach, if not attain, a system wide one number per product goal.

SUMMARY OF THE INVENTION

Based on the foregoing, one object of the present invention is to develop an efficient system for cataloging products without assigning more than one catalog number to a particular product.

Another object of the present catalog is to classify the items that are to be listed in a catalog so that an easy-to-refer-to catalog can be generated.

Another object of the present invention is to prevent an item from being assigned more than one item number by verifying the information that is input for each item to be included in the catalog.

Another object of the present invention is to create a catalog-generating system wherein, no matter how many item numbers exist in the MASTER CATALOG database, the response time of the catalog-generating system is maximized.

The present invention is accomplished by representing each catalog for a given geographic region, chain, or store as a separate database. The database contains for each product to be listed in a catalog for the store in the particular geographic region, for example, an assigned catalog product number, a UPC number, a description of the product, a category and classification assignment for that product, and a commodity code. A master catalog, containing a unique record for the first occurrence of each item in all of the different catalogs, is also provided. When it is desired to assign catalog numbers for products to be included in a new catalog (such as, for example, when a new geographic location is added to the order taking system) the master catalog is examined to determine whether the particular item to be included in the new catalog has previously been assigned a catalog number. The master catalog is updated once a catalog has been processed with new catalog numbers.

An input file is created for the products to be included in the new catalog. This file is created based upon information supplied by the stores that will serve the individuals that obtain the new catalog as to what products are sold by the store. A specific process is then performed to ensure that a particular product is not assigned more than one catalog number.

In view of the above, a method is disclosed for assigning a catalog item number to an item that is to be placed in a catalog, the method comprising the steps of:

inputting relevant information concerning the item into a computer;

comparing the inputted relevant information with information in a master list stored in the computer;

determining whether the inputted relevant information and the information in the master list results in a match; and assigning a unique catalog item number to the inputted item when no match.

An advantage of the present invention is that after the unique catalog item number is added to the master list, an updated master list is generated so that the master list always contains the most complete listing of all the items and their associated catalog item numbers. The updated master list can then be supplied to an item order taking facility.

Another advantage of the present invention is that an existing catalog item number can be assigned to the inputted item when a match results.

According to a preferred embodiment of the present invention, the step of inputting relevant information comprises inputting a universal product council code assigned to the item, and a description of the inputted item into the computer.

After every item is inputted into the computerized catalog producing system, a store catalog is generated. The catalog can be generated on a printer. This catalog lists the items inputted into the computer. In addition, each item listed in the catalog lists the unique catalog item number assigned to that item. In the preferred embodiment of the present invention, each item is listed in the catalog according to a category and classification of the inputted item.

According to the preferred embodiment of the present invention, an apparatus is disclosed for producing a catalog listing a plurality of items, in which each item in the catalog can be readily identified from a unique catalog item number associated with each item, comprising:

means for inputting relevant information concerning each item to be included in the catalog into a computer;

a memory for storing a master list of a plurality of items, each of the plurality of items having a unique catalog item number associated therewith;

means for comparing the relevant information with the master list; and means for assigning a newly created catalog item number to the inputted item if the comparison means fails to identify the inputted item from the plurality of items in the master list.

According to an advantage of the present invention, the apparatus further comprises means for retrieving the unique catalog item number that corresponds to one of the plurality of items in the master list that identifies an inputted item, and then assigning the retrieved unique catalog item number to the inputted item.

The master list is updated when a new catalog item number is assigned to an item. This updated list can be supplied to an order taking facility.

An advantage of the apparatus of the present invention is that the system is designed to accept a universal product council code assigned each item to be included in the catalog, and a description of each inputted item.

A method is disclosed for assigning an item number to an item that is to be placed in a catalog, comprising the steps of:

inputting information relating to an inputted item into a computer;

verifying that the inputted information complies with a set of predefined conventions;

determining whether the information relating to the inputted item corresponds to a master list item in a master list stored in the computer, each master list item having an item number associated therewith;

assigning an item number that is unique to the inputted item if it is determined that the inputted item does not correspond to one master list item in the master list;

assigning the item number associated with the master list item to the inputted item if it is determined that the inputted item corresponds to one master list item in the master list; and updating the master list to include the inputted item and its assigned item number, if the item number assigned to the inputted item is a unique number.

An advantage of the present invention is that the verifying step comprises the steps of ensuring that the inputted information contains a universal product council code and a description of the item that corresponds to the inputted information, and the correcting of the inputted information if the inputted information does not comply with the set of predefined conventions. In the preferred embodiment, the information inputted into the computer is obtained from information that has been written onto a worksheet.

Another advantage of the method of the present invention is that a catalog is formed based upon all the inputted items, wherein each inputted item is listed in the catalog according to a particular category and classification, each listed item in the catalog including a respectively assigned item number.

According to another advantage of the present invention, the step of assigning an item number that is unique to the inputted item if it is determined that the inputted item does not correspond to one master list item in the master list comprises the steps of determining the highest item number that currently exists in the master list, and then generating an item number for the inputted item, the generated item number being larger than the highest item number that exists in the master list. For example, the item number can be incremented by 1.

Another advantage of the present invention is that the updated master list can be forwarded to an order taking facility.

The determining step of the present method further comprises providing an operator who enters the inputted information with comparative information in a tangible form.

According to an object of the present invention, an apparatus is disclosed for assigning an item number to an item to be included in a catalog, in which the item number serves to identify the item, comprising:

means for inputting an item and relevant information about the item into a computer;

means for verifying that the inputted relevant information complies with a set of predefined conventions;

means for determining whether the inputted item corresponds to a master list item in a master list, the master list being stored in the computer, each master list item having an item number associated therewith;

means for assigning an item number that is unique to the inputted item if it is determined that the inputted item does not correspond to one master list item in the master list; and means for updating the master list to include each inputted item and its assigned unique item number.

An advantage of the apparatus of the present invention is that it can include means for assigning the item number associated with one master list item that corresponds to the inputted item to the inputted item if it is determined that the inputted item corresponds to the one master list item in the master list.

Another advantage of the apparatus constructed according to the present invention is that a plurality of inputted items can be stored, along with their assigned item numbers, until no more items are to be inputted into the computer, the computer then comprising means for organizing the inputted items into a predetermined order to produce a catalog, wherein the inputted items are listed in the catalog according to the predetermined order, each inputted item being provided in a listing including the item number assigned to the inputted item.

Another advantage is that the predetermined order in which the items are organized can comprise means for sorting the inputted items according to a particular category and classification.

A catalog can be generated by printing it on a printer.

According to an advantage of the apparatus of the present invention, the verifying means comprises:

means for determining whether the inputted data comprises a universal product council code and a description of the inputted item; and means for amending the inputted relevant information if the inputted relevant information does not comply with the predefined set of conventions.

An advantage of the present invention is that the means for assigning an item number that is unique to the inputted item if it is determined that the inputted item does not correspond to one master list item in the master list comprises:

means for determining the highest item number that exists in the master list;

means for incrementing the highest item number by a predetermined value, such as, for example, one; and means for associating the incremented item number to the inputted item.

According to a method of the present invention, a catalog is produced that contains a plurality of items therein, each item being listed in the catalog according to a predetermined category and classification scheme, comprising the steps of:

inputting each item and relevant information about each item into a computer, the computer verifying that the inputted information contains a universal product council code and a valid description of the inputted item;

enabling the inputted information in the computer to be modified if the inputted relevant information on an item contains an invalid universal product council code or an invalid description;

determining whether the inputted information relating to each inputted item corresponds to a master list item in a master list stored in the computer, each master list item having an item number associated therewith;

assigning an item number that is unique to the inputted item if it is determined that the inputted item does not correspond to one master list item in the master list;

assigning the item number associated with one master list item to the inputted item if it is determined that the inputted item corresponds to the one master list item in the master list;

storing the inputted item, along with its assigned item number, in the computer;

updating the master list to include the inputted item and its assigned item number;

determining when no more items are to be inputted into said computer, at which time the stored inputted items, along with their item numbers, are organized into a predetermined category and classification order; and generating a catalog, wherein the inputted items are listed in the catalog according to the predetermined category and classification order, each listing for the inputted items including an item number assigned to a respective inputted item.

BRIEF DESCRIPTION OF THE DRAWINGS

The foregoing and other objects, features, and advantages of the invention will be apparent from the following more particular description of a preferred embodiment, as illustrated in the accompanying drawings which are presented as a non-limiting example, in which like reference characters are used to refer to similar parts throughout the various views, and wherein:

FIGS. 2A-2H illustrate a representative catalog category and classification index that can be used with the computerized catalog producing system of the present invention to produce a STORE CATALOG;

FIG. 3 illustrates a sample page from a STORE CATALOG produced by the present invention;

FIG. 4 illustrates a worksheet used by participating vendors for creating a catalog using the present invention;

DETAILED DESCRIPTION OF THE PREFERRED EMBODIMENTS

The assignee of the present invention and associated store chains (such as, for example, supermarket chains) can produce the catalogs that are used in conjunction with the previously described shop-at-home service. The catalogs are produced on a per-chain basis, but also could be produced on a regional, national, or individual store basis, if desired.

Figure 1:
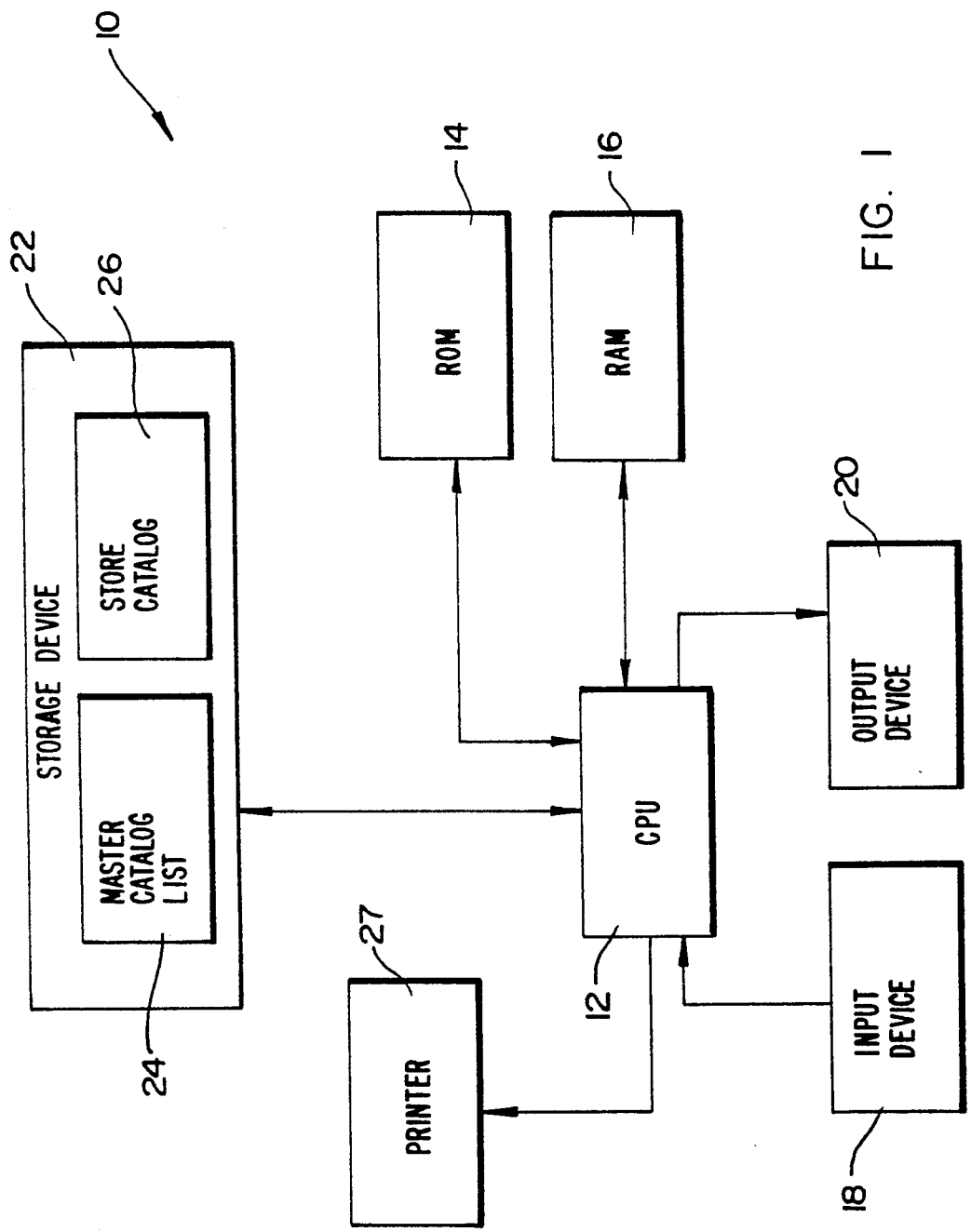
FIG. 1 illustrates a preferred embodiment of a computerized catalog producing system according to the present invention.

The overall catalog producing system of the present invention is illustrated in FIG. 1. According to the present invention, a computer system 10 executes a specially prepared cataloging program. The computer 10 comprises a central processor unit 12, read only memory (ROM) 14, random access memory (RAM) 16, at least one input device 18, such as a keyboard that is used by an operator that creates the store catalogs, and at least one output device 20, such as a monitor or a printer. If several operators are to be employed in the creation of the store catalogs, each operator is provided with their own monitor and keyboard. The catalog producing system also contains a storage device 22 that functions to store a MASTER CATALOG database 24 and at least one STORE CATALOG 26. In addition, the catalog producing system includes a printer 27 that is used for printing out a list of the MASTER CATALOG database and/or each STORE CATALOG.

The storage device 22 can be, for example, a hard disk drive or a tape drive. Alternatively, a non-volatile memory, such as an electrically erasable programmable read only memory (EEPROM) can be used. It is understood that variations may occur with respect to the specific type of storage device 22, input device 18 and output device 20 that are employed without departing from the scope and spirit of the present invention.

The cataloging program of the present invention may be stored on the storage device 22, such as a hard disk, and loaded into the RAM 16 for execution by the computer system 10. This arrangement permits the software program to be easily updated as improvements are made to the cataloging system. Alternatively, the cataloging program may be permanently stored in the ROM 14 of the computer system 10 so that it is instantly available for use whenever electrical power is supplied to the computer system, in which case updates to the system become somewhat more involved, because ROMs 14 containing the old program would have to be removed from the computer system 10 before new ROMs 14, containing an updated program, could be installed in the computer system 10. However, it is understood that either method (or other program storage methods not discussed) could be employed without departing from the scope and spirit of the present invention.

In the following discussion of the present invention, a MASTER CATALOG database and at least one STORE CATALOG is produced. The MASTER CATALOG database is initially empty (i.e., no items are in the MASTER CATALOG database). As the first STORE CATALOG is produced, the items that form the basis for the first STORE CATALOG are also added to the MASTER CATALOG database. Thus, the contents of the first STORE CATALOG is equivalent to contents of the MASTER CATALOG database. That is, the items listed in the first STORE CATALOG that is produced are the same items that are listed in the MASTER CATALOG database. Accordingly, the first catalog 28 that is produced will hereinafter be referred to as the MASTER CATALOG database 24.

As additional STORE CATALOGS are produced, the MASTER CATALOG database is appended to include new items that are to be listed in the latest produced STORE CATALOG, but which are not listed in any previously produced STORE CATALOG. Accordingly, as additional STORE CATALOGS are produced, additional items will be added to the MASTER CATALOG database.

In creating the layout of the catalogs, items are classified into departments, called categories, such as, for example, Dairy, Frozen Food, Baby Needs, etc. Each catalog contains approximately 70 different categories. An example of the breakdown used by the assignee of the present invention is illustrated in FIGS. 2A-2H. Each category contains at least one product grouping or classification. For example, the Baby Needs category includes the classifications Baby Food; Diapers; Baby Cereal; etc. Each catalog contains approximately 450 classifications, although the precise number can, of course, be varied.

FIG. 3 illustrates a sample page of a store, region, or chain catalog 28 produced by the method and apparatus of the present invention. Each page of the catalog 28 has a Section 28A that lists a plurality of products under an appropriate category (such as, for example, "CEREAL & BREAKFAST FOODS"). Each line of Section 28A describes one product, and includes such information as, for example, the manufacturer's name, product name and quantity. Furthermore, a portion of Section 28A may be highlighted, as indicated by the notation 28B, by printing the products in a color (such as, for example, red) that differs from Section 28A (which may be, for example, in black ink). Each page of the catalog 28 may also contain various size pictures 30 of products offered for sale (or, other suitable pictorials or advertisements), as shown in Sections 28C and 28D of FIG. 3. Finally, full page advertisements (not shown) may be placed on the inside front page, inside back page and center pages of the catalog 28.

In creating the catalog 28, every participating vendor should first complete a worksheet 32, as shown in FIG. 4, in which every product offered for sale by the vendor is to be listed. Each product is to be placed within a given category and classification. The vendor must list a designated UPC code for each product, along with a brand name, product name, product description and size.

Every manufactured product is assigned a designated code (known as a UPC code) by the Universal Product Council. The UPC code is either ten (10) or eleven (11) digits long. For example, a product may have UPC code No. 0235170876, as illustrated in FIG. 4. In the example shown in FIG. 4, the first five (5) digits signify a Bumble Bee-manufactured product. That is, every Bumble Bee product would start with a UPC code of 02351. The remaining digits of the UPC code belong to a specific Bumble Bee product. For instance, in FIG. 3, the last six (6) digits of the illustrated UPC code, 790876 identifies a 6.5 oz. can of white tuna in water. Thereafter, in a separate column, a brief description of the product represented by the UPC code is provided by the vendor, including the product name, and its weight and/or size.

Every product to be listed in the catalog 28 is assigned a unique catalog item number (i.e., catalog number 34) for customers to use when ordering products, as shown in FIG. 3. Every product with the same UPC code has the same designated catalog item number. For example, catalog item number 37285 is intended to identify Smuckers Grape Jelly, 12 oz., in every catalog 28 produced by the present invention, regardless of whether the catalog 28 is distributed, for example, by a first chain in Chicago, a second chain in New York, or a third chain in Washington, D.C.

In order to simplify the discussion of the present invention, the production of the catalogs 28 and assignment of the unique catalog item number 34 for each product, will be separated into two parts; to wit, the production of a MASTER CATALOG and the production of a STORE CATALOG. This will be accomplished with reference to separate flow charts for producing the MASTER CATALOG and the STORE CATALOG. However, it is understood that in practice a single software program may be employed that handles the production of both the MASTER CATALOG and each STORE CATALOG.

Production of MASTER CATALOG

Figure 5:
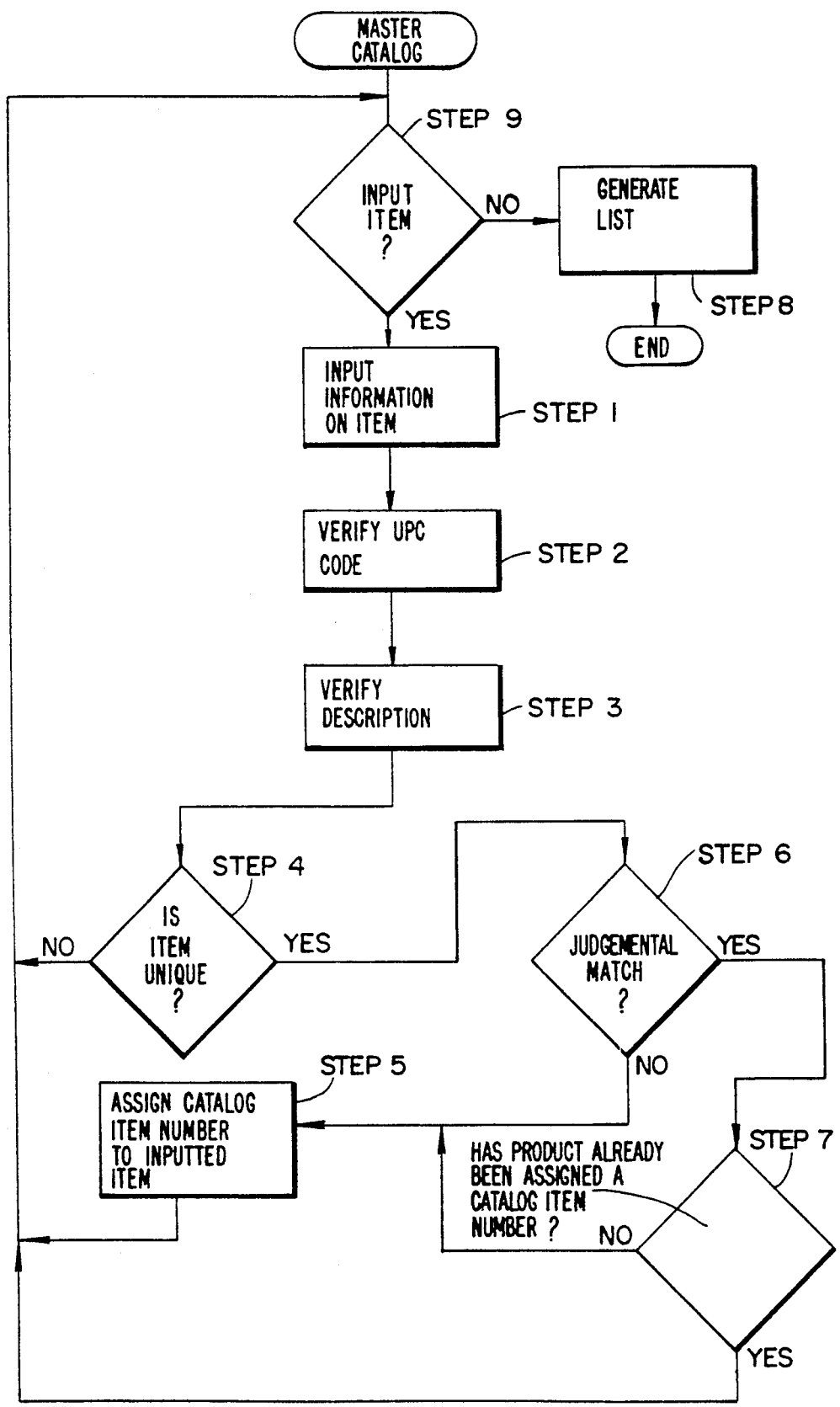
FIG. 5 is a flow chart illustrating the steps that are performed to produce a MASTER CATALOG according to the preferred embodiment of the present invention.
Figure 6:
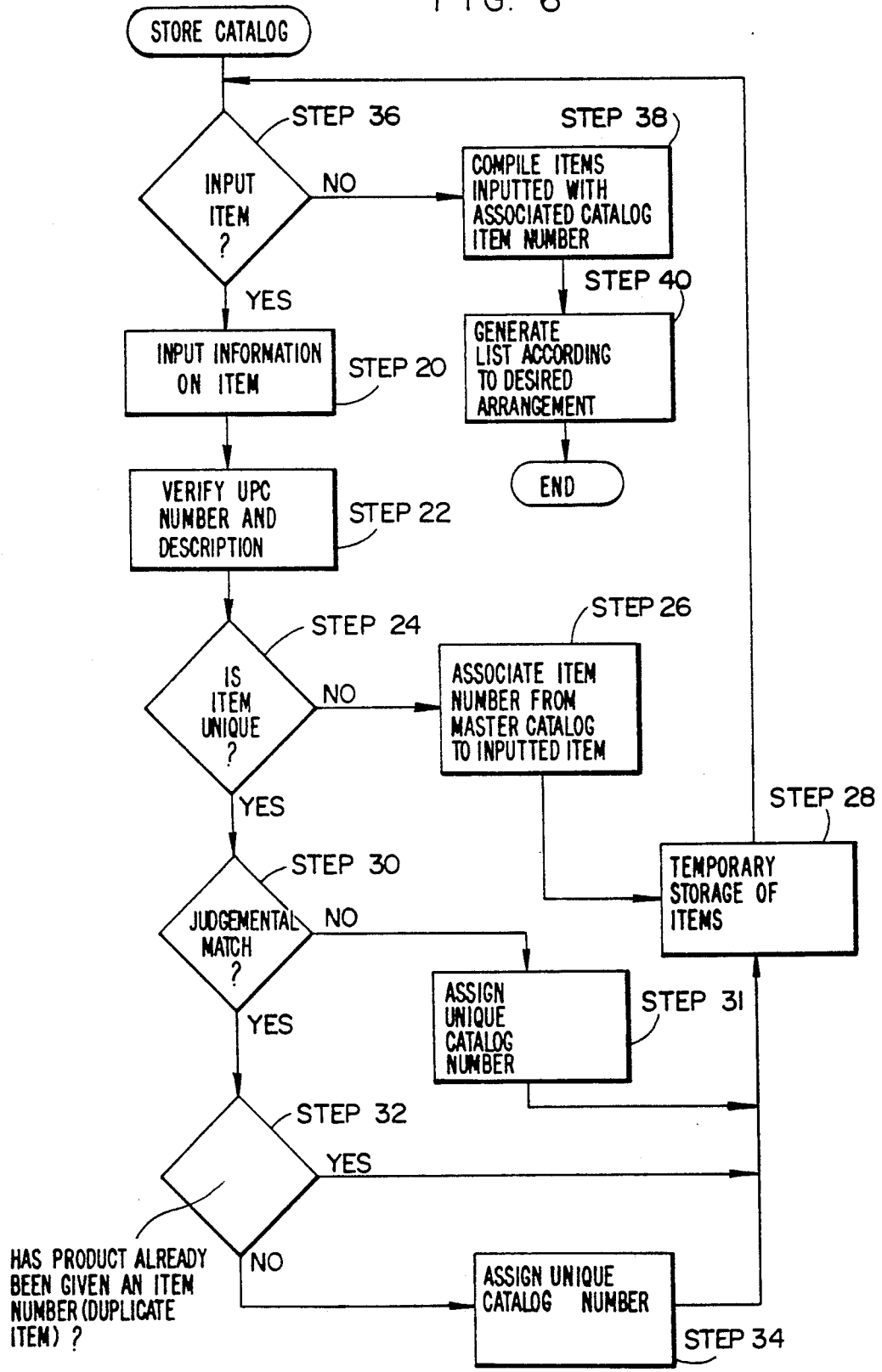
FIG. 6 is a flow chart illustrating the steps that are performed to produce an individual STORE CATALOG according to the preferred embodiment of the present invention.

A flow chart for producing the MASTER CATALOG is illustrated in FIG. 5. Initially, an operator inputs information (step 1) about a product into the computer 10, based upon the information written onto the worksheet 32. The catalog system of the present invention verifies that the inputted record complies with all syntax rules (steps 2 and 3). In other words, the software program of the catalog system 10 ensures that the inputted UPC code is either ten (10) or eleven (11) digits long, and that the inputted description is no more than fifty (50) characters in length. If the description is more than fifty (50) characters, or does not adequately identify the product, provisions are provided to allow the operator to make corrections.

After an item is entered and verified, step 4 is executed by the computer to determine whether a match exists between the inputted UPC code and UPC codes associated with items that are already in the MASTER CATALOG database 24. If the particular item entered into the system is not found in the MASTER CATALOG database 24 (such as would occur, for example, when the MASTER CATALOG is initially created), the catalog-generating system of the present invention executes step 6 so as to make a judgmental match of the inputted item.

The judgmental matching of descriptions is performed at steps 6 and 7. This test assumes that the brand name of the product is the first thing specified in the product description line of the worksheet. Up to 128 possible candidates can be selected for display to the operator, based upon, for example, the first one or two words of the product description, size match, classification match, or commodity codes match.

Each word in the inputted description is compared with each candidate in the list and a count of the number of matches is assigned to each entry. In the preferred embodiment, a size match is assigned a higher weight than a manufacturer match. However, it is understood that a different type of match, such as, for example, a manufacturer match, can be assigned a higher weight than a size match. The items are then sorted based upon the number of "hits" scored for each item. In the preferred embodiment, the items are sorted in descending order, so that the item having the highest number of hits is first and the item having the fewest hits is last.

The sorted list is then presented to the operator so that the operator can make an intelligent choice as to which product the vendor listed on the worksheet 32. In the preferred embodiment, the list is displayed on a monitor 20. However, the sorted list could be outputted to a different output device, such as, for example, a printer.

In the preferred embodiment, in which the list is outputted to a monitor 20, the operator selects the desired item by placing a cursor under the displayed item and entering a select command, such as by pressing a key on the keyboard 16 that is labelled "ENTER". The operator also has the option of re-selecting the list based upon a changing word count minimum match, classification search match, or search in which the size of the product is either considered or ignored. In addition, the operator has the option of skipping the displayed inputted item if the inputted item does not make a match with any item contained in the MASTER CATALOG database 24. Thereafter, processing advances to step 9 to determine whether additional items are to be input into the system.

If, on the other hand, it is determined in step 4 that the inputted item is not unique (such as would occur, for example, if the same item is entered into the computer system 10 more than once), the catalog-generating system determines that a catalog number has previously been assigned to a like-type item. Accordingly, it is not necessary to assign another catalog number to the inputted item, since a catalog number already exists for the inputted item. Thus, execution of the catalog-generating system proceeds to step 9 to determine whether another item is to be inputted into the computer 10.

It is noted that while the present invention verifies the UPC number and description only when the information is initially inputted, it is envisioned that an additional verification step can be required between step 4 and step 9 if the execution of step 4 results in a determination that the inputted item is not unique. This second verification step can be added so as to reduce the possibility of, for example, an erroneously inputted UPC number.

Catalog item numbers 34 for all unmatched entries (that is, inputted items that did not have a corresponding catalog item number 34 in the MASTER CATALOG database 24) are assigned by determining the highest existing catalog item number in the MASTER CATALOG database 24 and incrementing the number by one (1). Then, the newly created highest catalog item number is assigned to the unmatched inputted item. This process is repeated for each unmatched inputted item until all the items in the system have a corresponding catalog item number 34. In the preferred embodiment of the present invention, products are assigned item numbers from a pool of numbers between 1,000 and 99,999. However, the range of the pool of numbers can be varied without departing from the scope and spirit of the present invention.

When step 9 determines that no more items are to be inputted into the catalog-generating system, step 8 is executed to generate a new master list report. The new master list report is provide to the central order facility. Thus, when a customer calls the central order taking facility to place an order using the catalog item numbers assigned to each product, the operator at the central order facility can easily identify the desired ordered items, regardless of the location of the customer and/or the store being shopped. Further, when each new store, chain or area is added to the system, new entries are appended to the MASTER CATALOG database so that all new products and their respective catalog numbers will be included in the MASTER CATALOG database. If desired, the master catalog list can be printed on printer 27.

In the preferred embodiment of the invention, the master list report is sorted by category and class. However, the report can be sorted differently without departing from the scope or spirit of the present invention.

Production of STORE CATALOG

The individual store catalogs are produced in a manner similar to the production of the MASTER CATALOG. That is, the operator inputs information concerning a product into the computer 10 (step 20), based upon the information written onto the worksheet 32. The entered information is verified at step 22 and provisions are made to allow the operator to make any necessary corrections.

Thereafter, the computer system 10 executes step 24 to determine whether inputted item is unique. That is, step 24 determines whether the UPC code of the entered item matches a UPC code in the MASTER CATALOG database 24. If the catalog system determines that the inputted item is not unique (that is, the inputted item matches an item in the MASTER CATALOG database), the catalog system obtains the unique catalog item number 34 that has been attached to that product in the MASTER CATALOG database 24 and attaches it to the inputted item (step 26). The item (along with the attached item number) is then stored for later compilation (step 28).

If step 4 of the catalog producing system of the present invention determines that the inputted item is unique (that is, there is no match between the UPC code of the inputted item and the UPC codes in the MASTER CATALOG database 24), the catalog producing system proceeds to make a judgmental match decision (steps 30-34). These steps, which correspond to steps 5-7 in FIG. 5, was discussed above, with respect to the MASTER CATALOG. That is, the inputted information is compared with each candidate in the MASTER CATALOG database 24 and a count of the number of matches is assigned to each entry. The items are then sorted based upon the number of "hits" scored for each item and displayed on the operator's monitor so that the operator can select the appropriate item.

The operator selects the desired item by, for example, placing a cursor on the monitor 20 under the displayed item and entering a select command. If it is determined that the selected item already exists in the MASTER CATALOG database 24, the catalog producing system obtains the unique catalog item number 34 that has been attached to that product in the MASTER CATALOG database 24 (step 32) and attaches it to the inputted item. The newly inputted item (along with the attached item number) is then stored for later compilation (step 28).

If the inputted item does not have any corresponding catalog item number, one is assigned to the product (step 34). Thereafter, the item (along with the attached item number) is stored for later compilation (step 28).

While the present invention verifies the UPC number and description only when the information is initially inputted, it is envisioned that an additional verification step can be required between step 24 and step 26 if the execution of step 24 results in a determination that the inputted item is not unique. This second verification step can be added so as to reduce the possibility of, for example, an erroneously inputted UPC number.

When no more items are to be inputted to create a particular STORE CATALOG, as determined at step 36, the catalog producing system compiles all the inputted items (along with their respective item numbers) at step 38. The items are sorted according to category (i.e., Baby Needs) and classification (i.e., Diapers), which was discussed above. A report is then generated (step 40) that lists the items by category and classification. This report is equivalent to the store catalog 28, minus, for example, advertisements, which are inserted, if desired, for example, by an advertising or art department.

In addition to compiling all the inputted items so as to produce a particular STORE CATALOG, the computer catalog system generates a new report of all the newly assigned unique catalog item numbers. This list is appended to the MASTER CATALOG database file, so as to facilitate the production of future catalogs. Thereafter, according to the preferred embodiment, a new MASTER CATALOG database file is produced to replace the previously existing MASTER CATALOG database file. This new file is supplied to the central order taking facility so as to facilitate the taking of orders from customers that place an order using the newly produced catalog. The newly created MASTER CATALOG database file is provided to the central order taking facility, for example, by supplying a new magnetic tape to the central order taking facility. Alternatively, the new file can be transmitted over a telephone line to the central order taking facility using a modem. However, it is understood that other transmission methods may be used without departing from the scope and spirit of the invention.

Again, either the MASTER CATALOG database or STORE CATALOGS can be printed in any desired format on printer 27. The MASTER CATALOG database or STORE CATALOGS can be printed, either as a report or as a complete, ready-to-use catalog.

In use, an operator inputs items into the catalog-generating system, which determines whether an item number has previously been assigned to the inputted item. If an item number has previously been assigned to the inputted item, the assigned number is retrieved from the MASTER CATALOG database and associated with the inputted item. Then, the inputted item is temporarily stored while another item is inputted. On the other hand, if it is determined that an item number has not previously been assigned to the inputted item, a unique item number is generated and associated with the inputted item.

When no more items are to be input into the catalog-generating system, the items in the temporary file are retrieved and sorted by category and classification. A STORE CATALOG may then be printed out on printer 27 or saved as a computer file. In addition, the items that were not found in the MASTER CATALOG database (that is, the items for which unique item numbers were generated) are appended to the MASTER CATALOG database for use with the production of the next STORE CATALOG. The appended MASTER CATALOG database may also be printed out on the printer 27 or saved as a computer file.

The implementation of the present invention reduces the incidence of assigning more than one item number to an item. Since the incidence of repetitive entries is reduced, the capacity of a given catalog database is maximized. Therefore, the system can accommodate more products for the given system capacity.

The present invention increases the chance that only one item number is assigned to a product, even if, for example, the composition of the specific item is changed. For example, the manufacture of Coca-Cola soda is generally the same throughout the year. Thus, this soda may be given a first UPC number. However, during the Passover season, the manufacturing ingredients and/or procedures of the soda differs. Thus, the Kosher for Passover soda may be given a second UPC number. However, the present invention ensures that both types of Coca-Cola soda will be assigned the same item number in the produced catalog. Thus, the production of the catalog is simplified, because only one Coca-Cola soda will be listed in the catalog.

Although the present invention has been described with reference to particular means, materials and embodiments, it is to be understood that the invention is not limited to the particulars disclosed and extends to all equivalents within the scope of the claims.

What is claimed is:

1. A method for assigning a catalog item number to an item that is to be placed in a catalog, the method comprising the steps of:
   inputting relevant information concerning the item into a computer;
   comparing the inputted relevant information with information in a master list stored in the computer;
   determining whether the inputted relevant information and the information in the master list results in a match; and
   assigning a unique catalog item number to the inputted item when no match results.

2. The method of claim 1, further comprising adding the assigned unique catalog item number to the master list so as to generate an updated master list.

3. The method of claim 2, further comprising supplying the updated master list to an item order taking facility.

4. The method of claim 1, further comprising assigning an existing catalog item number to the inputted item when a match results.

5. The method of claim 1, wherein the step of inputting relevant information comprises the step of inputting a universal product council code assigned to the item, and a description of the inputted item, into the computer.

6. The method of claim 1, further comprising assigning a plurality of catalog item numbers to a plurality of items, and generating a store catalog that lists the items inputted into the computer, each item of the catalog having its own unique catalog item number.

7. The method of claim 6, further comprising listing each item in the catalog according to a category and classification of the inputted item.

8. The method of claim 6, wherein the store catalog is generated by printing the catalog.

9. An apparatus for producing a catalog listing a plurality of items, in which each item in said catalog can be readily identified from a unique catalog item number associated with each item, said apparatus comprising:
   means for inputting relevant information concerning each item to be included in said catalog into a computer;
   a memory for storing a master list of a plurality of items, each of said plurality of items having a unique catalog item number associated therewith;
   means for comparing said relevant information with said master list; and
   means for assigning a newly created catalog item number to said inputted item if said comparison means fails to identify said inputted item from said plurality of items in said master list.

10. The apparatus of claim 9, further comprising:
    means for retrieving the unique catalog item number that corresponds to one of said plurality of items in said master list that identifies an inputted item; and
    means for assigning said retrieved unique catalog item number to said inputted item.

11. The apparatus of claim 9, further comprising means for creating an updated master list to include said newly created catalog item number.

12. The apparatus of claim 9, wherein said means for inputting relevant information comprises means for inputting a universal product council code assigned to each item and a description of each said inputted item.

13. The apparatus of claim 9, further comprising means for compiling every inputted item so as to create a catalog that lists every product inputted, each compiled inputted item being listed in said catalog with said catalog item number that was assigned to said item.

14. The apparatus of claim 11, wherein said updated master list is supplied to an order taking facility.

15. The apparatus of claim 13, wherein said items in said catalog are organized according to a predetermined category and classification designation.

16. A method for assigning an item number to an item that is to be placed in a catalog, comprising the steps of:
    inputting information relating to an inputted item into a computer;
    verifying that the inputted information complies with a set of predefined conventions;
    determining whether the inputted information relating to the inputted item corresponds to a master list item in a master list stored in the computer, each master list item having an item number associated therewith;
    assigning an item number that is unique to the inputted item if it is determined that the inputted item does not correspond to one master list item in the master list;
    assigning the item number associated with the master list item to the inputted item if it is determined that the inputted item corresponds to one master list item in the master list; and
    updating the master list to include the inputted item and its assigned item number, if the item number assigned to the inputted item is a unique number.

17. The method of claim 16, wherein the verifying step comprises the steps of:

ensuring that the inputted information contains a universal product council code and a description of the item that corresponds to the inputted information; and correcting the inputted information if the inputted information does not comply with the set of predefined conventions.

18. The method of claim 16, wherein the information inputting step comprises entering information into the computer from information that has been written onto a worksheet.

19. The method of claim 16, further comprising forming a catalog based upon all inputted items, wherein each inputted item is listed in the catalog according to a particular category and classification, each listed item in the catalog including a respectively assigned item number.

20. The method of claim 16, wherein the step of assigning an item number that is unique to the inputted item if it is determined that the inputted item does not correspond to one master list item in the master list comprises the steps of:

determining the highest item number that currently exists in the master list; and generating an item number for the inputted item, the generated item number being larger than the highest item number that exists in the master list.

21. The method of claim 20, wherein the step of generating an item number for the inputted item comprises the step of incrementing the highest item number in the master list by one.

22. The method of claim 21, further comprising forwarding the updated master list to an order taking facility.

23. The method of claim 16, further comprising forwarding the updated master list to an order taking facility.

24. The method of claim 16, wherein the determining step further comprises providing an operator who enters the inputted information with comparative information in a tangible form.

25. An apparatus for assigning an item number to an item to be included in a catalog, wherein said item number serves to identify said item, said apparatus comprising:

means for inputting an item and relevant information about said item into a computer;

means for verifying that said inputted relevant information complies with a set of predefined conventions;

means for determining whether said inputted item corresponds to a master list item in a master list, said master list being stored in said computer, each master list item having an item number associated therewith;

means for assigning an item number that is unique to said inputted item if it is determined that said inputted item does not correspond to one master list item in said master list; and means for updating said master list to include each said inputted item and its assigned unique item number.

26. The apparatus of claim 25, further comprising means for assigning said item number associated with one master list item that corresponds to said inputted item to said inputted item if it is determined that said inputted item corresponds to said one master list item in said master list.

27. The apparatus of claim 26, further comprising means for storing a plurality of said inputted items, along with their assigned item numbers, until no more items are to be inputted into said computer, said computer then comprising means for organizing said inputted items into a predetermined order to produce a catalog, wherein said inputted items are listed in said catalog according to said predetermined order, each said inputted item being provided in a listing including said item number assigned to said inputted item.

28. The apparatus of claim 27, wherein said predetermined order in which said items are organized comprises means for sorting said inputted items according to a particular category and classification.

29. The apparatus of claim 27, including means for printing said catalog.

30. The apparatus of claim 29, including means for transmitting said updated master list to an order taking facility, said order taking facility including means for requesting an item by reciting said item number assigned to said requested item.

31. The apparatus of claim 25, wherein said verifying means comprises:

means for determining whether said inputted data comprises a universal product council code and a description of said inputted item; and means for amending said inputted relevant information if said inputted relevant information does not comply with said predefined set of conventions.

32. The apparatus of claim 25, wherein said means for assigning an item number that is unique to said inputted item if it is determined that said inputted item does not correspond to one master list item in said master list comprises:

means for determining the highest item number that exists in said master list;

means for incrementing said highest item number by a predetermined value; and means for associating said incremented item number to said inputted item.

33. The apparatus of claim 32, wherein said means for incrementing said highest item number by a predetermined value increments said highest item number by one.

34. A method for producing a catalog that contains a plurality of items therein, each item being listed in the catalog according to a predetermined category and classification scheme, comprising the steps of:

inputting each item and relevant information about each item into a computer, the computer verifying that the inputted information contains a universal product council code and a valid description of the inputted item;

enabling the inputted information in the computer to be modified if the inputted relevant information on an item contains an invalid universal product council code or an invalid description;

determining whether the inputted information relating to each inputted item corresponds to a master list item in a master list stored in the computer, each master list item having an item number associated therewith;

assigning an item number that is unique to the inputted item if it is determined that the inputted item does not correspond to one master list item in the master list;

assigning the item number associated with one master list item to the inputted item if it is determined that the inputted item corresponds to said one master list item in rhe master list;

storing the inputted item, along with its assigned item number, in the computer;

updating the master list to include the inputted item and its assigned item number;

determining when no more items are to be inputted into said computer, at which time the stored inputted items, along with their item numbers, are organized into a predetermined category and classification order; and generating a catalog, wherein the inputted items are listed in the catalog according to the predetermined category and classification order, each listing for the inputted items including an item number assigned to a respective inputted item.

35. The method of claim 34, wherein said catalog is generated by printing.

36. The method of claim 34, further comprising forwarding the updated master list to an order taking facility.

37. The method of claim 35, further comprising forwarding the updated master list to an order taking facility, whereby an items in the catalog can be ordered from said facility by item number.

* * * * *